No. 752,250. PATENTED FEB. 16, 1904.
W. C. NORMAN.
PIE PAN.
APPLICATION FILED MAY 29, 1903.
NO MODEL.
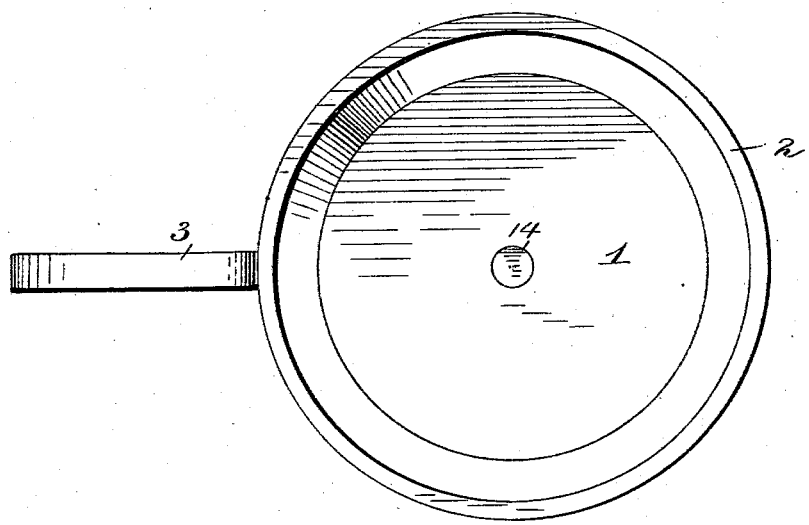
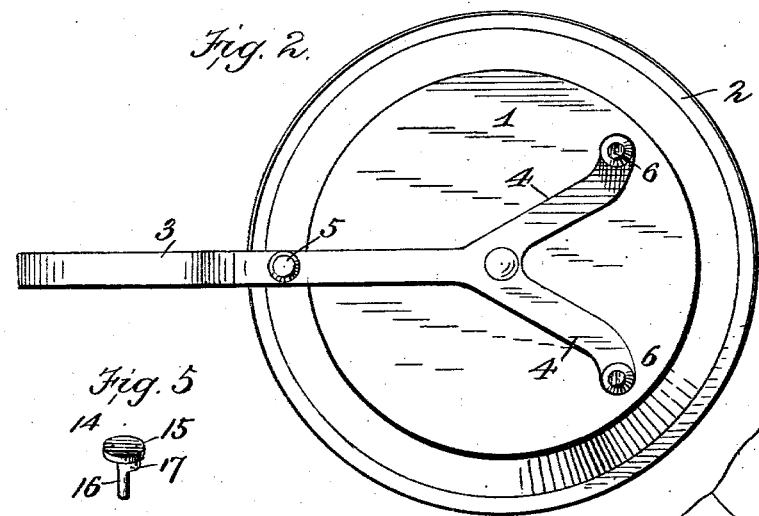
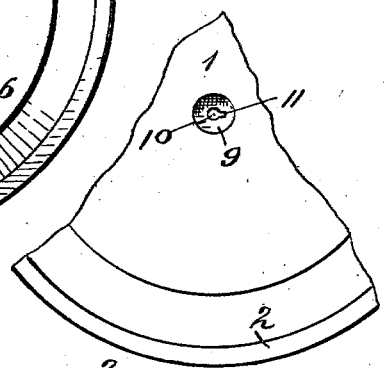
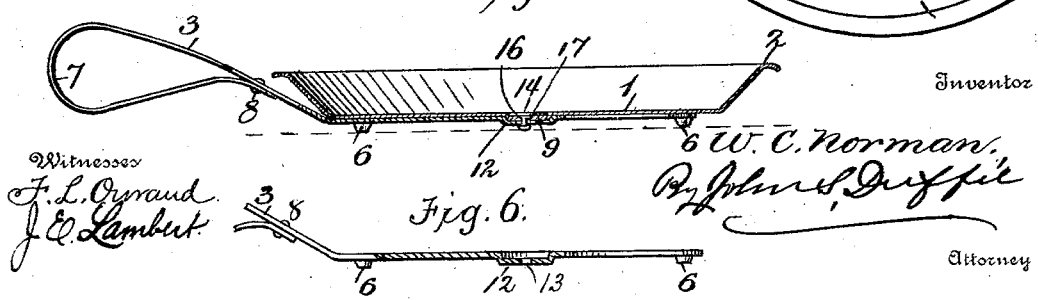
Witnesses
F. L. Oyraud
J. E. Lambert
Inventor
W. C. Norman
By John S. Duffie
Attorney No. 752,250. Patented February 16, 1904.

UNITED STATES PATENT OFFICE.

WILLIAM C. NORMAN, OF SMITHTON, ARKANSAS.

PIE-PAN.

SPECIFICATION forming part of Letters Patent No. 752,250, dated February 16, 1904.

Application filed May 29, 1903. Serial No. 159,288. (No model.)

*To all whom it may concern:*

Be it known that I, WILLIAM C. NORMAN, a citizen of the United States, residing at Smithton, in the county of Clark and State of Arkansas, have invented certain new and useful Improvements in Pie-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention is a device for baking pies.

The main purpose of the invention is to bake pies; but it may be used for baking custards, cake, or anything of the kind.

The purpose of the invention is to keep the persons doing the baking from burning their hands and having their faces flushed and scorched by stooping down before the stove and turning the plate and putting it in the stove and removing it therefrom.

The invention consists in a pan pivoted on a handle provided with feet, so that it will sit in the stove and so that it may be easily rotated without removing it from the stove, and the handle is to enable the person using the pan to remove it and replace it readily.

In the accompanying sheet of drawings, Figure 1 is a top plan view of my invention. Fig. 2 is a bottom plan view. Fig. 3 is a vertical section. Fig. 4 is a detail view showing the depression and perforation in the center of the plate. Fig. 5 is a perspective view of the rivet. Fig. 6 is a longitudinal sectional view of the handle and feet, partly in section.

My invention is described as follows:

1 represents the top face of the pan, provided with a flange 2. This flange may be smooth, as shown, or it may be fluted.

3 represents the handle. The handle extends to the center of the plate and then divides into two arms 4. The said handle and arms have secured to their under faces feet. One foot 5 is secured to the under face of the handle near the edge of the pan. Feet 6 are secured one on each end and to the under faces of the arms 4.

The handle 3 is turned back, forming a loop 7, and is riveted to itself by a rivet 8 near the edge of the plate.

The plate has in its center a depression 9, and through said depression is a circular perforation 10, and extending from said circular perforation 10 is a slot 11.

The handle has in it immediately under said depression 9 a downward projection 12, which exactly corresponds with said depression 9 and in which said depression fits. Said projection has through it a perforation 13, which registers with the perforation 10 just mentioned.

The plate is journaled to the handle by means of a rivet 14. The head 15 of said rivet is circular and exactly fits the depression 9 in the plate, and extending from the lower face of the head is a pin 16, which fits the perforation 13 in the handle, and just under the head 15 and extending from the pin is a feather 17, that fits in the slot 11.

After the pin has been passed through the perforations 10 and 13 and the feather 17 fitted into the slot 11 it (the pin) is secured in place by a head or small nut. The purpose of the slot and feather is to prevent the head 15 from turning in the depression 9, because if it were to turn in such depression it would in time become a little loose and the pan might leak a little at that point.

The plate may be turned while the pan is in the stove by using a fork, a wire, or something of the kind, or it may be taken out for the purpose of turning it.

Having described my invention, what I claim as new, and desire to secure by Letters Patent, is—

1. A baking-pan consisting of a plate, provided with a perforation in its center; a handle having on its outer end, a loop and through its inner end, a perforation; arms extending from its inner end and feet secured to the lower face of said handle and arms, substantially as shown and described and for the purposes set forth.

2. A baking-pan consisting of a plate, having in its center a depression, and through said depression a perforation and extending from said perforation a slot; a handle having through its inner end, a perforation concentric with the perforation in said depression; a pin provided with a head fitting said depression; a feather extending from said pin and fitting said slot, said pin and feather passing through said perforations and slot and secured in place, substantially as shown and described and for the purposes set forth.

3. A baking-pan consisting of a plate having in its center a depression and through said depression a perforation and extending from said perforation a slot; a handle having at its inner end a downward projection, receiving the depression of the pan and through said projection a perforation concentric with the perforation through said depression; a pin provided with a head fitting said depression; a feather extending from said pin and fitting said slot; said pin and feather passing through the perforation and slot, through said depression and through the perforation in said downward projection and secured in place, substantially as shown and described and for the purposes set forth.

4. A baking-pan consisting of a plate having in its center a depression and through said depression a perforation and extending from said perforation a slot; a handle having at its inner end a downward projection receiving said depression and a perforation through said downward projection concentric with the perforation in the depression of the pan; arms extending from the inner ends of said handle; feet secured to the lower face of the handle and to the extreme ends and lower faces of said arms; a pin provided with a head fitting in said depression; and a feather fitting said slot; said pins and feather passing through the perforation and slot in said depression and through the perforation in said handle and secured in place, substantially as shown and described and for the purposes set forth.

In testimony whereof I affix my signature in presence of two witnesses.

WILLIAM C. NORMAN.

Witnesses:
A. W. GRIZZLE,
T. T. HUGHES.